United States Patent [19]
Kornrumpf et al.

[11] 3,742,173
[45] June 26, 1973

[54] METHOD AND EQUIPMENT FOR COOKING ELECTRONICALLY BY SPECIFYING WATTS SETTING

[75] Inventors: William P. Kornrumpf; John D. Harnden, Jr., both of Schenectady, N.Y.

[73] Assignee: General Electric Company, Schenectady, N.Y.

[22] Filed: Dec. 27, 1971

[21] Appl. No.: 212,058

[52] U.S. Cl........... 219/10.41, 219/10.49, 219/10.77
[51] Int. Cl. ............................................... H05b 5/04
[58] Field of Search .................... 219/10.41, 10.49, 219/10.75, 10.77; 99/1, DIG. 14

[56] References Cited
UNITED STATES PATENTS

| | | | |
|---|---|---|---|
| 3,530,499 | 9/1970 | Schroeder | 219/10.49 |
| 2,971,754 | 2/1961 | Seyfried | 219/10.77 X |
| 3,566,243 | 2/1971 | Landis | 219/10.75 X |
| 3,256,417 | 6/1966 | Merrett | 219/10.49 X |
| 2,090,692 | 8/1937 | Melton | 219/10.75 X |
| 2,510,770 | 6/1950 | Bohn | 219/10.77 |

*Primary Examiner* — J. V. Truhe
*Assistant Examiner* — B. A. Reynolds
*Attorney* — John F. Ahern, Donald R. Campbell et al.

[57] ABSTRACT

A method of cooking food using a recipe that specifies the absolute power level of an electronic range or appliance which inductively heats a cooking utensil. The power in watts generated by the electronic circuit driving an induction heating coil is a true indication of the power actually coupled to the utensil and used to heat the food. Induction cooking equipment for practicing the method requires only the addition of a wattmeter or other power measuring and indicating instrumentation. Adjustment to the desired watts setting can be manual or automatic.

12 Claims, 7 Drawing Figures

Inventors
William P. Kornrumpf
John D. Harnden Jr
by Ronald R. Campbell
Their Attorney Inventors
William P. Kornrumpf
John D. Harnden, Jr.
by Donald R. Campbell
Their Attorney

METHOD AND EQUIPMENT FOR COOKING ELECTRONICALLY BY SPECIFYING WATTS SETTING

BACKGROUND OF THE INVENTION

This invention relates to a method of cooking food and to induction cooking appliances and ranges equipped to practice the method, and more particularly to cooking food by a recipe that specifies the power level setting of the appliance and is indicative of the power actually coupled to the utensil for heating the food.

Conventional recipes for cooking food on the common gas range or electric resistance heating range are expressed in relative heating or cooking terms, or give a temperature to be set. Many recipes call for high, medium, or low heat, and others use widely-known cooking terms such as warm, simmer, and low boil. These are all relative terms that tend to have different interpretations and meanings to different people. The setting of the temperature called for by a recipe requires the judgment of the cook or the use of the type of range having a sensor for sensing the temperature of the cooking utensil or a separate portable thermometer inserted into the food. Furthermore, although some recipes are described in terms of temperature settings, there are many cooking processes for which the power required to generate the utensil heating is a more accurate definition of the requirement. Power is an absolute quantity that can result in improved cooking by defining more explicitly the cooking process.

In existing gas and electric resistance surface heating units, it has been impossible to delineate any relationship between the power supplied to the heating element and the heat generated in the cooking utensil and actually used to heat the food. This is most easily understood in the case of the electric range. Although a specified amount of electrical power can be delivered to the heating element, the quantity of heat transferred to the utensil depends on such variables as the relative flatness of the heating element and utensil and their relative diameters. The resistance heating element upon aging tends to develop a curvature, and likewise utensils after a period of use tend to warp, often due to the extreme temperature gradients caused by the heating element. The resulting air gaps are unpredictable in size and affect the efficiency of heat transfer. In addition, the condition and nature of the reflector influences the performance. A similar analysis can be made of the gas burner.

Cooking appliances and ranges based on the principles of induction heating by contrast deliver a predictable amount of electrical power to the utensil. Such initial and time varying factors as the utensil's physical condition and size and its abuse and compliance to the heat producing element, and other factors entering into the efficiency of the heat transfer system, do not directly relate to its receptive efficiency on an induction surface heating unit. Recently developed cool top, ultrasonic frequency, solid state induction cooking equipment suitable for the practice of the invention is described in the following two patent applications both filed on Nov. 19, 1971 and assigned to the same assignee as the present invention: Ser. No. 200,526 by David L. Bowers, Donald S. Heidtmann, and John D. Harnden, Jr.; and Ser. No. 200,424 by John D. Harnden, Jr. and William P. Kornrumpf.

SUMMARY OF THE INVENTION

The new method for cooking food using an induction cooking range or other electronic equipment for inductively heating a cooking utensil generally comprises the steps of (a) measuring one or more selected circuit parameters that are indicative of the electrical power supplied to the utensil, (b) providing an output indication of the measured electrical power, and (c) adjusting the electronic circuit to obtain the power setting — usually in watts — specified by a cooking recipe. Either d-c or a-c currents and voltages can be measured to obtain the power generated by the equipment, such as the d-c supply current, both the d-c supply current and voltage, the a-c induction heating coil current and voltage, or the a-c input current and voltage. In a domestic induction surface heating unit, the unit is typically provided with ammeter or wattmeter type instrumentation for displaying the measured power to the user, who adjusts the power level of the unit to the setting called for by the recipe. In an automatic arrangement, the user sets the desired watts level and the circuit adjusts to generate that amount of power.

DESCRIPTION OF THE PREFERRED EMBODIMENTS

Figure 1:
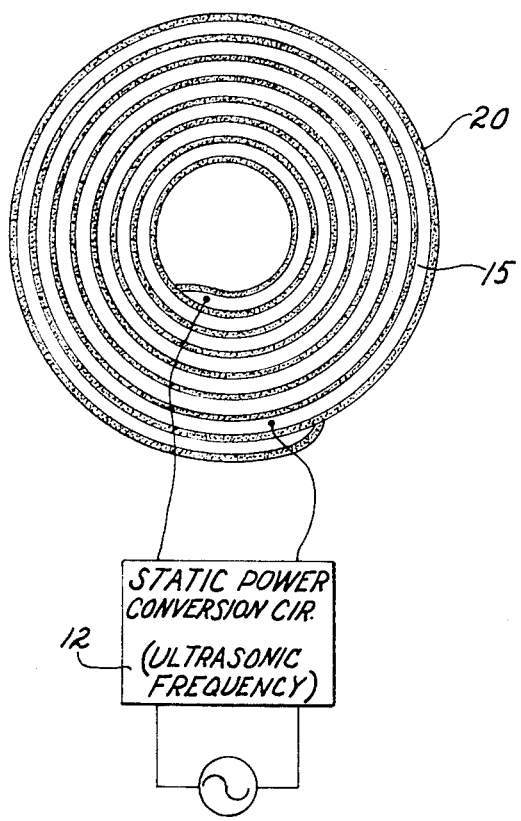
FIG. 1 is a block diagram of a static power conversion circuit for supplying ultrasonic frequency power to a flat spiral induction heating coil, shown in plan view, in a solid state induction cooking appliance.
Figure 2:
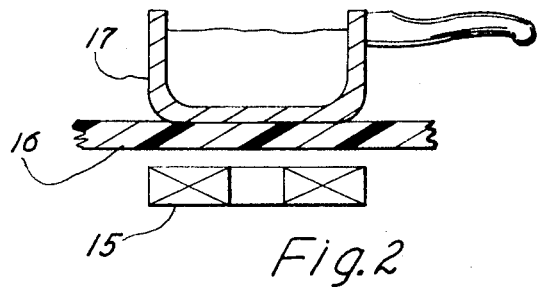
FIG. 2 is a diagrammatic cross-sectional view showing the relation of the induction heating coil to the appliance top and cooking utensil.

The induction cooking appliance shown in FIGS. 1–3 will be described with regard to an induction surface heating unit in an electric range, but essentially the same mechanical structure and electronic circuitry in higher and lower power versions is suitable for commercial cooking equipment and for a portable countertop food cooking or warming appliance. The static power conversion circuit indicated generally at 12 is energized by a single phase commercially available 60 Hz, 120 or 240 volt source of alternating current potential, an equivalent polyphase source, or by a battery source of direct current potential. Static power converter 12 comprises a solid state inverter for converting a unidirectional supply voltage to an ultrasonic frequency voltage wave for driving the induction heating coil 15. Induction heating coil 15 is a single layer, annular, flat spiral, air-core or ferromagnetic-core coil wound with solid flat strip conductors or braided ribbon conductors. To generate sufficient magnetic flux to heat the utensil to the desired level, coil 15 is tightly wound with the short cross-sectional dimension of the conductors facing upwards and adjacent turns separated by a flat insulating strip 20.

In the cooking appliance (FIG. 2) induction heating coil 15 is appropriately mounted in a horizontal position immediately below a non-metallic or substantially non-metallic support 16 typically made of a thin sheet of glass or plastic. Support plate 16 is commonly referred to as the cooking surface and supports the metallic cooking utensil 17 to be heated. Cooking utensil 17 is an ordinary cooking pot or pan, a frying pan, or some other available metallic utensil (including metallic sheets) used in food preparation, and can be made of magnetic or non-magnetic materials. Special cooking utensils are not required although the best and most efficient results are obtained by optimizing the size, shape, and material of the utensil. Operation of static power converter 12 to impress an ultrasonic frequency wave on induction heating coil 15 results in the generation of an alternating magnetic field. The magnetic flux is coupled across the air gap through non-metallic support 16 to utensil 17. At ultrasonic operating frequencies in the range of 18 to 40 kHz, the cooking appliance is inaudible to most people.

Figure 3:
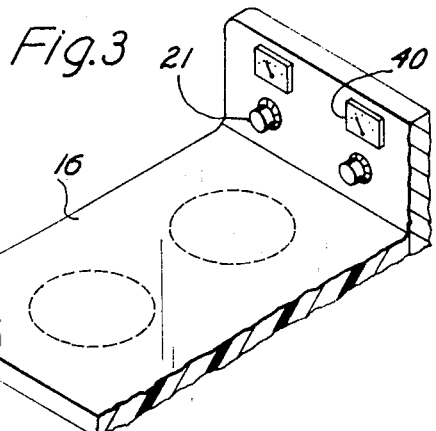
FIG. 3 is a fragmentary view of an induction range showing the smooth utensil support and control panel.

As shown in FIG. 3, an important feature of induction cooking equipment is the relatively smooth and substantially unbroken utensil supporting surface provided by non-metallic support 16. At ultrasonic frequencies, there are insignificant reaction forces which at lower frequencies would cause utensil 17 to move horizontally when placed on the appliance cook top approximately centered with respect to one of the induction surface unit positions indicated in dotted lines. Control knob 21 for each unit on the upstanding control panel of the range turns the individual unit on and off and sets the desired heating level or specific temperature to which the utensil is to be heated. Among the advantages of induction cooking are, briefly, that the surface of support 16 remains relatively cool; spilled foods do not burn and char and hence, both support 16 and utensil 17 are easy to clean; and the unobstructed utensil support is available for other cooking tasks. The utensil is heated more uniformly than is the case with the conventional gas range or electric resistance heating range, and the transfer of energy to utensil 17 is relatively efficient since heat is generated only in the utensil where it is wanted. Further, the inductive heating of cooking utensils results in a low thermal mass system. Since there is relatively low storage of heat in the utensil, the heating level or temperature to which the utensil is heated can be changed rapidly, as from boiling to simmering to warming levels.

Figure 5:
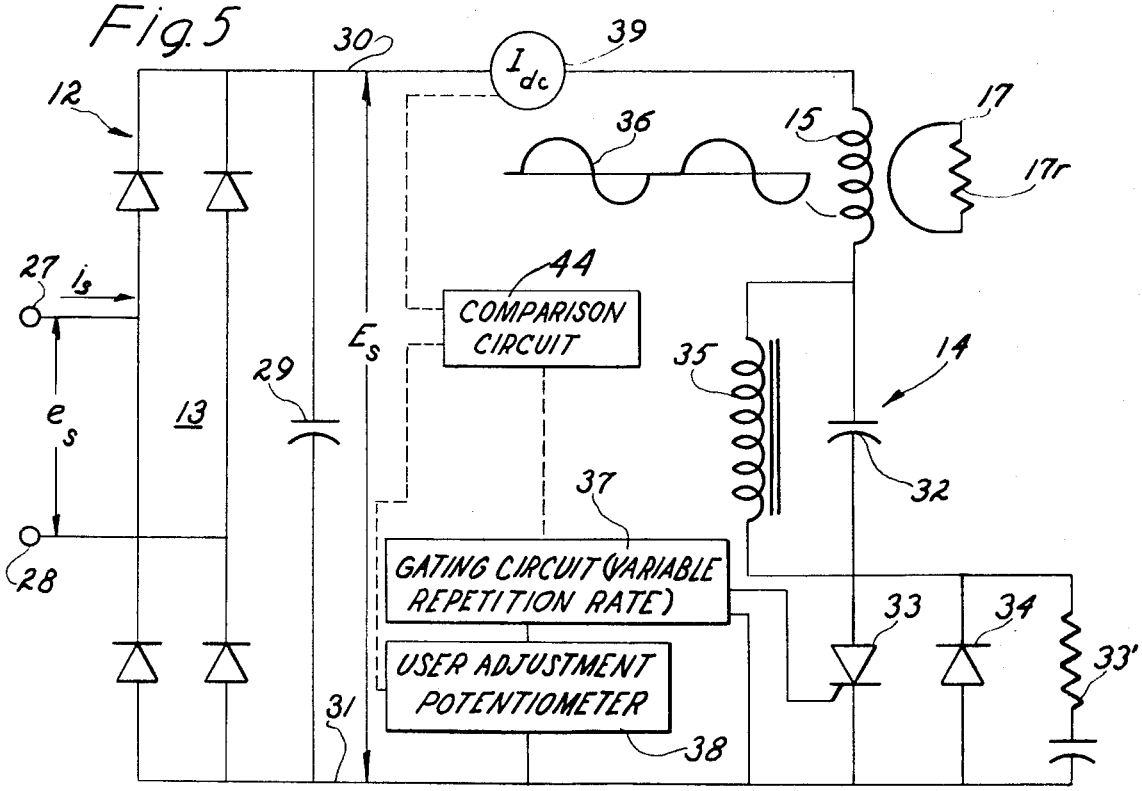
FIG. 5 is a detailed circuit diagram of one form of static power converter including instrumentation for measuring the d-c circuit parameters as an approximation of the power supplied to the utensil with the added circuitry needed for automatic adjustment shown in dashed lines.

FIG. 5 shows by way of illustration, one of the many different embodiments of the power converter circuit 12 that can be used in the practice of induction cooking. As is here shown, static power conversion circuit 12 most commonly comprises a rectifier 13 and a solid state inverter 14, and is energized by a single phase 60 Hz, 120 or 240 volt source. More specifically, input terminals 27 and 28 are connected to a d-c voltage supply comprising full wave diode bridge rectifier 13 having a filter capacitor 29 connected between its output terminals 30 and 31. The d-c supply voltage for inverter 14 accordingly has an approximately constant magnitude. Inverter 14 is a one-thyristor series resonant inverter with a variable repetition rate or operating frequency to control the amount of power coupled to the utensil, and thus the heating level or the temperature to which the utensil is heated. This is a relatively simple and inexpensive inverter in which the induction heating coil 15 is employed in a dual function to couple power to the utensil and to provide commutating inductance in the thyristor commutation circuit. The power circuit is comprised by induction heating coil 15 connected in series circuit relationship with a commutating capacitor 32 and silicon controlled rectifier 33 between the d-c power supply terminals 30 and 31. A diode 34 to conduct power current in the reverse direction is connected across the load terminals of thyristor 33. A series RC circuit 33' is usually connected across the load terminals of thyristor 33 for $dv/dt$ protection to limit the rate of re-application of forward voltage to the device. A reset inductor 35 connected across commutating capacitor 32 charges capacitor 32 negatively during the non-conducting intervals of the thyristor-diode combination. The inverter generates damped sinusoidal current pulses as shown at 36 that flow through induction heating coil 15. Each cycle of current flow is initiated by a gating impulse applied to thyristor 33 by a variable repetition rate gating circuit 37. The repetition rate and thus the amount of power supplied to utensil 17 is set by a user adjustment potentiometer 38, which preferably is adjusted by control knob 21 on the range control panel (FIG. 3).

In operation, it is assumed that commutating capacitor 32 is charged negatively by reset inductor 35 when the next conduction cycle is initiated by the gating on of thyristor 33. Capacitor 32 charges positively through the resonant coil 15. When the voltage on capacitor 32 reaches a peak, the current through the power circuit reverses as diode 34 conducts and applies reverse voltage to the thyristor. Capacitor 32 discharges negatively through diode 34 until the capacitor voltage reaches a peak negative value, at which time the current through the power circuit tries to change direction. However, since the thyristor is not gated on at this moment, the current in coil 15 remains zero. During the interval of conduction of the thyristor-diode combination, the current in reset inductor 35 increases due to the net positive d-c voltage on capacitor 32 during the conduction cycle. The reset inductor 35 discharges during the circuit off-time, thereby replenishing the system energy and charging capacitor 32 negatively ready for the next cycle of operation. Increasing the repetition rate of gating circuit 37 increases both the amplitude of the sinusoidal current pulses and also the frequency of the application of current pulses to induction heating coil 15. In summary, there are two effects that increase the power in watts supplied to utensil 17 when the inverter frequency is increased. There are larger, more frequently applied current pulses in induction heating coil 15. The operation of this inverter is described in more detail in the aforementioned application, Ser. No. 200,424.

The inverter load is the electrical loss in utensil 17. With respect to the utensil load, induction heating coil 15 functions as the primary winding of an air-core transformer. Utensil 17 functions as a single turn secondary winding with a series resistance 17r representing the resistive part of the I²R or eddy current losses, and hysteresis losses where applicable. The currents and voltage induced in utensil 17 when the induction surface unit is in operation are determined essentially by the transformer laws. The reflected utensil inductance forms an element of the total inductance of the series resonant circuit.

In an ideal transformer the secondary side power is equal to the primary side power. Accordingly, a measurement of the power level in the inverter power circuit is a true indication of the power actually coupled to the utensil and actually used to heat the food. It is realized that supply voltage variations can easily cause power variations as much as 30 percent either way and thus drastically effect the performance of the range. In view of the basic nature of the induction heating phenomenon of coupling magnetic energy across a gap with a metallic receptor, there is a predictable amount of power in watts delivered to the utensil. The utensil's physical condition, in particular whether it is perfectly flat or has warpage, does not directly relate to its receptive efficiency on an induction surface heating unit. There is no problem with aging and warping of the heating element and the utensil as there is with a conventional gas range or electric resistance heating range.

Since the power level of the electronic inverter power circuit is a true indication of the power actually coupled to the utensil, cooking recipes can specify the watts level of the inverter power circuit, or in general, of the circuit generating the alternating magnetic field. The cooking process is defined more precisely and a higher degree of successfulness is made possible by a predictable amount of power delivered to the food process. The repeatability of the cooking process with consistent results on different ranges is greatly enhanced. Power is an absolute quantity and can be set with precision, rather than relying on such relative words as high heat, medium heat, or low heat, or the relative cooking terms commonly used such as warm, simmer, and low boil. A typical instruction using the new cooking method specifies, for example, heat at 500 watts for ten minutes. The new method of cooking food is extremely simple and can be practiced by non-technical persons such as the housewife or chef. The new method is most commonly performed by measuring the power in watts generated by the electronic circuit, displaying the measured power to the user, and adjusting the electronic circuit to obtain the electrical power setting specified by the cooking recipe. In this type of range, the power is set manually by the user.

Although the power actually coupled to the utensil 17 is most accurately determined by measuring the high frequency a-c current flowing through induction heating coil 15 and the voltage across the coil, a good approximation of the power in watts generated by inverter 14 is obtained by measuring the d-c supply current $I_{dc}$ and the d-c supply voltage $E_s$ at the d-c supply output terminals 30 and 31. The power in watts is of course the product of the d-c supply current in amperes and the d-c supply voltage in volts. Since the d-c supply voltage $E_s$ in the embodiment of static power converter 12 shown in FIG. 5 is approximately constant, the power is proportional to $I_{dc}$. The only instrumentation required to obtain the power level of inverter 14, then, is a d-c ammeter 39 preferably connected between terminal 30 and the adjacent end of induction heating coil 15. A conventional ammeter with a moving coil type of meter movement is suitable. Alternatively, a simple inexpensive magnetic semiconductor current sensor can be used to measure the current level in the line between terminal 30 and coil 15. Examples of suitable magnetic semiconductor current sensors are those manufactured by F. W. Bell, Siemens, and the newer silicon Hall element sensors such as those manufactured by Sprague and Hudson. The measured d-c current is displayed to the user in an appropriate manner such as by mounting the dial 40 of the ammeter or wattmeter on the range control panel next to the associated control knob 21 (see FIG. 3). The scale of dial 40 is graduated in watts or other electrical power units. The user then adjusts control knob 21 to obtain the power level indicated by the cooking recipe.

Figure 4A:
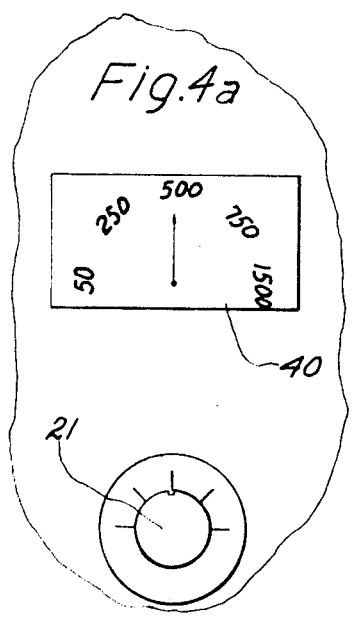
FIG. 4a is an enlarged plan view of the control knob and watts scale for a single induction surface unit shown in FIG. 3, equipped for manual adjustment to a watts setting.

In the general case, the d-c power supply has a variable output voltage $E_s$, and it is necessary to measure the d-c supply voltage between terminals 30 and 31 as well as the d-c current in order to derive the power in watts. Dial 40 is then the indicating mechanism of a wattmeter. Conventional meter movements can be used, or the output of a magnetic semiconductor current sensor in combination with a sensor of the d-c voltage. Many different types of instrumentation can be used in the practice of the invention. The modified form of static power conversion circuit 12 illustrated in FIG. 6 uses a phase controlled full wave bridge rectifier 13' and a filter additionally including series filter inductor 29' to obtain a variable d-c supply voltage $E_s$. Inverter 14' is a modified version of inverter 14 shown in FIG. 5, in which reset inductor 35 is connected in series with the inverse-parallel combination of thyristor 33 and diode 34 between terminals 30 and 31. The resonant circuit comprising coil 15 and commutating capacitor 32 is connected between the anode of thyristor 33 and negative d-c supply terminal 31. In this form of the inverter, the impedance of reset inductor 35 is sufficiently large to supply relatively constant current to the resonant circuit. With thyristor 33 or diode 34 conducting, the ultrasonic frequency return path is to ground rather than through filter capacitor 29. The operation of inverter 14' is similar to inverter 14 with the possible exception that commutating capacitor 32 is charged positively by reset inductor 35 during the circuit offtime. To obtain a wide control range of the power output of the static power converter, it is necessary to use some other technique of varying the output power in addition to the previously described technique of using a variable ultrasonic operating frequency. A reasonable and economically feasible range of ultrasonic frequencies for solid state equipment is only 18 kHz to 40 kHz. As is disclosed in the concurrently filed application of John D. Harnden, Jr. and William P. Kornrumpf, Ser. No. 212,351 a desirable range of output power for domestic cooking ranges need not exceed 50 watts to 1500 watts. This is a 30:1 ratio, and requires control of the input voltage $E_s$ by use of phase controlled rectifier 13' or some other circuit arrangement for controlling the input voltage when lower power outputs are required. The enlarged view of the indicating dial 40 of the wattmeter shown in FIG. 4 illustrates a scale with the preferred power range of 50 to 1500 watts. A voltmeter or other sensor for measuring $E_s$ is shown at 41.

Figure 6:
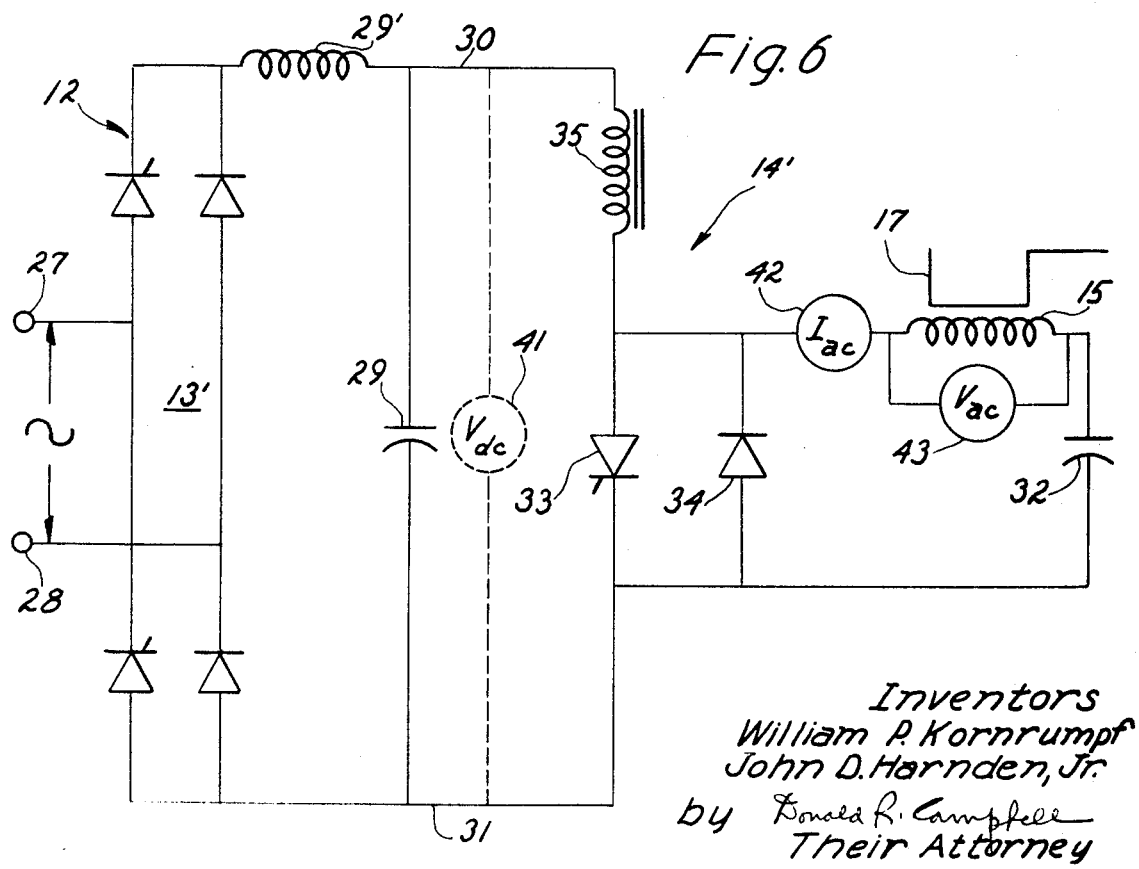
FIG. 6 is a detailed circuit diagram of a modified form of static power converter with instrumentation for measuring a-c circuit parameters, in particular the induction heating coil current and voltage, as an approximation of the power supplied to the utensil.

As previously mentioned, a true indication of the power level in inverter 14' and of the power actually coupled to utensil 17 and used to heat the food, is obtained by measuring the a-c current flowing induction heating coil 15 and the a-c voltage across the coil. Thus, in FIG. 6 are illustrated diagrammatically instruments 42 and 43 for measuring the a-c circuit parameters $I_{ac}$ and $V_{ac}$. The high frequency measurement of power in the coil may be somewhat less desirable than measurement of the d-c circuit parameters because of the high frequency nature of the a-c circuit and the demands upon the measurement devices. Any suitable measurement devices can be used, including the newly developed magnetic semiconductor devices which provide a reasonable measure of these quantities. It is also possible, of course, to determine power by measuring the a-c supply voltage $e_s$ and input current $i_s$ as illustrated in FIG. 5.

Figure 4B:
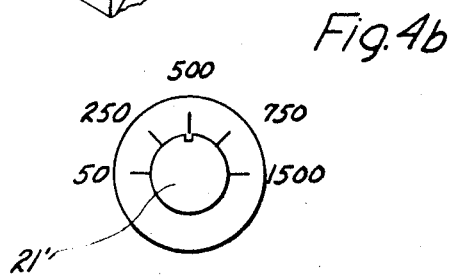
FIG. 4b shows the watts control knob of a range equipped for automatic adjustment.

The new method of cooking can also be practiced using an electric range equipped so that the user manually sets the desired watts level, with the adjustment of the circuit power level being made automatically or under programmed control as from a clock mechanism. The modified control knob 21' is shown in FIG. 4b and is provided with a watts scale that permits the user to set the desired watts level directly. Referring to the dashed line shown in FIG. 5, the static power converter additionally includes a solid state comparison circuit 44 of conventional design that compares a signal indicative of the setting of user adjustment potentiometer 38 with a signal indicative of the measured power, here shown as a signal determined by the current measured by ammeter 39. The error signal is used to adjust the repetition rate of gating circuit 37.

The new food cooking method and induction surface heating units equipped to practice the method are advantageous for use in the converse manner, that is, by those who write the recipe or by the user who wishes to explain to others how to cook a favorite dish. In this case, the user notes the power setting at which the desirable results are obtained. This is much more precise and is reproducible with consistent results.

In summary, a new method of cooking food using induction cooking equipment equipped to measure and indicate electrical power is based on the principle that in induction heating, a predictable amount of power is delivered to the utensil. The method and equipment have been discussed with regard to both manual and automatic adjustment to the desired power level. The use of cooking recipes that specify an absolute power level define the cooking process more precisely and make possible better cooking results.

While the invention has been particularly shown and described with reference to several preferred embodiments thereof, it will be understood by those skilled in the art that the foregoing and other changes in form and details may be made therein without departing from the spirit and scope of the invention.

What we claim as new and desire to secure by Letters patent of the United States is:

1. A method for cooking food using an induction cooking appliance having an electronic circuit for coupling variable electrical power to a cooking utensil comprising the steps of measuring at least one electronic circuit parameter needed to derive the approximate electrical power generated by said electronic circuit and coupled to the cooking utensil, providing an output indication of the measured electrical power, and adjusting the electronic circuit to a selected electrical power level in absolute power units at which the food is cooked for a predetermined interval of time as called for by a food cooking recipe.

2. A method according to claim 1 wherein said electronic circuit includes a direct current supply and an inverter driving an induction heating coil, and the measuring of at least one electronic circuit parameter includes measuring the variable output parameters of said direct current supply.

3. A method for cooking food using an induction cooking unit with a substantially unbroken cooking surface, and a static electronic circuit comprising a direct current supply and a variable output power inverter for supplying ultrasonic electrical power to an induction heating coil for heating a cooking utensil, comprising the steps of measuring the selected static electronic circuit parameters needed to derive the approximate electrical power generated by said inverter and coupled to the cooking utensil, displaying the measured electrical power in watts units to the user, and adjusting said static electronic circuit and the electrical power generated by said inverter to a setting in watts units specified by a food cooking recipe at which the food is cooked for a predetermined interval of time.

4. A method according to claim 2 wherein the measuring of the static electronic circuit parameters comprises measuring the output current and voltage of said direct current supply to derive the approximate power generated by said inverter.

5. A method according to claim 3 wherein said direct current supply has a substantially constant output voltage, and the measuring of the static electronic circuit parameters comprises measuring only the output current of said direct current supply to derive the approximate power generated by said inverter.

6. A method for cooking food using an induction cooking unit with a substantially unbroken cooking surface, and a static electronic circuit comprising a direct current supply and a variable output power inverter for supplying ultrasonic electrical power to an induction heating coil for heating a cooking utensil, comprising the steps of measuring the static electronic circuit parameters needed to derive the approximate electrical power generated by said inverter and coupled to the cooking utensil, setting a selected power level in watts units as specified by a food cooking recipe, and adjusting the static electronic circuit and the electrical power generated by said inverter to the watts unit setting at which the food is cooked for a predetermined internal of time.

7. A method according to claim 6 in which the measuring of the static electronic circuit parameters includes measuring the variable output parameters of said direct current supply.

8. A solid state induction cooking appliance for cooking food by setting an absolute electrical power level in conventional power units as specified by a cooking recipe comprising an induction heating coil mounted adjacent a substantially unbroken non-metallic cooking surface and producing a magnetic field for heating a cooking utensil, a static power conversion circuit comprising a direct current supply and an ultrasonic frequency inverter for generating variable electrical power that is supplied to said induction heating coil, electrical power instrumentation connected to measure the approximate electrical power generated by said inverter as an approximation of the power coupled to the cooking utensil and used to heat the food, and a control panel including an indicating device graduated in the conventional power units for displaying absolute power levels to the user, and means for adjusting said static power conversion circuit so that the approximate electrical power generated by said inverter has a selected value set by the user.

9. A cooking appliance according to claim 8 wherein said electrical power instrumentation comprises an ammeter connected to measure the output current of said direct current supply.

10. A cooking appliance according to claim 8 wherein said electrical power instrumentation comprises a watt-meter connected to measure the output current and voltage of said direct current supply.

11. A cooking appliance according to claim 8 wherein said electrical power instrumentation comprises a watt-meter connected to measure the ultrasonic current flowing in said induction heating coil and the voltage across said coil.

12. A solid state induction cooking appliance for cooking food by setting an absolute electrical power level in watts units as specified by a cooking recipe comprising an induction heating coil mounted adjacent a substantially unbroken non-metallic cooking surface and producing a magnetic field for heating a cooking utensil, a static power conversion circuit comprising a direct current supply and an ultrasonic frequency inverter for generating variable electrical power that is supplied to said induction heating coil, electrical power instrumentation connected to measure the approximate electrical power generated by said inverter as an approximation of the power coupled to the cooking utensil and used to heat the food, and a control panel having mounted thereon the indicating device of said electrical power instrumentation to display to the user the measured power in watts, and a user control for adjusting said static power conversion circuit to a desired absolute power level in watts.

* * * * *